No. 846,204. PATENTED MAR. 5, 1907.
J. HETTRICH.
CORN HARVESTER.
APPLICATION FILED DEC. 6, 1905.

7 SHEETS—SHEET 1.

INVENTOR
JOHN HETTRICH

BY *Munn & Co.*

ATTORNEYS

WITNESSES

No. 846,204. PATENTED MAR. 5, 1907.
J. HETTRICH.
CORN HARVESTER.
APPLICATION FILED DEC. 6, 1905.

7 SHEETS—SHEET 2.

WITNESSES:
INVENTOR
JOHN HETTRICH
BY
ATTORNEYS

No. 846,204. PATENTED MAR. 5, 1907.
J. HETTRICH.
CORN HARVESTER.
APPLICATION FILED DEC. 6, 1905.

7 SHEETS—SHEET 5.

WITNESSES:

INVENTOR
JOHN HETTRICH
BY
ATTORNEYS

No. 846,204. PATENTED MAR. 5, 1907.
J. HETTRICH.
CORN HARVESTER.
APPLICATION FILED DEC. 6, 1905.

7 SHEETS—SHEET 6.

WITNESSES:
E. M. Callaghan.
C. E. Trainor

INVENTOR
JOHN HETTRICH
BY Munn & Co
ATTORNEYS

No. 846,204. PATENTED MAR. 5, 1907.
J. HETTRICH.
CORN HARVESTER.
APPLICATION FILED DEC. 6, 1905.
7 SHEETS—SHEET 7.
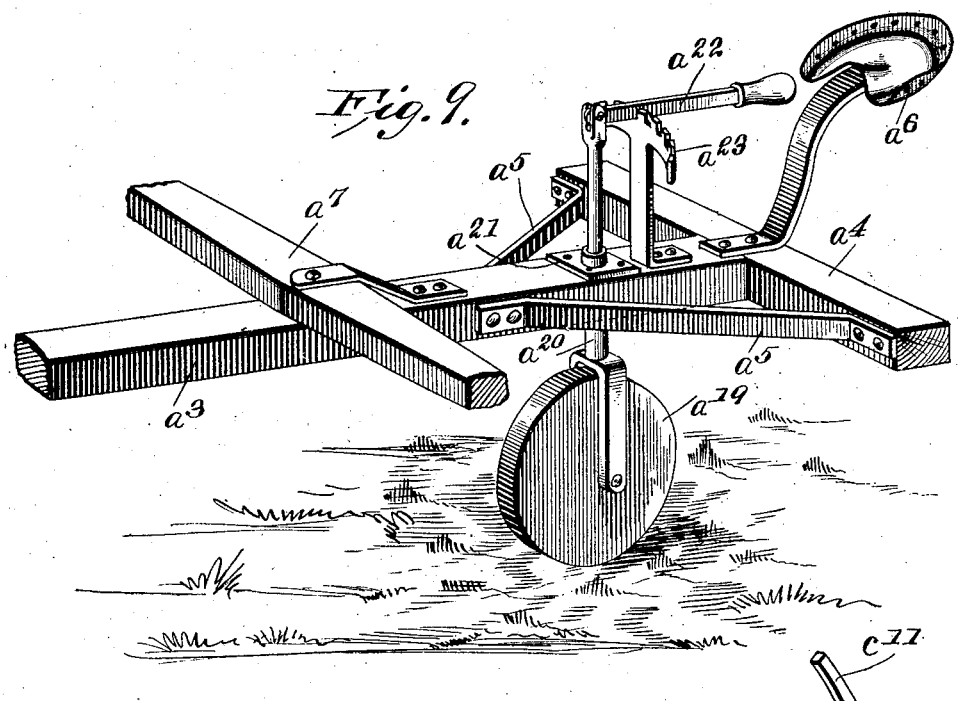
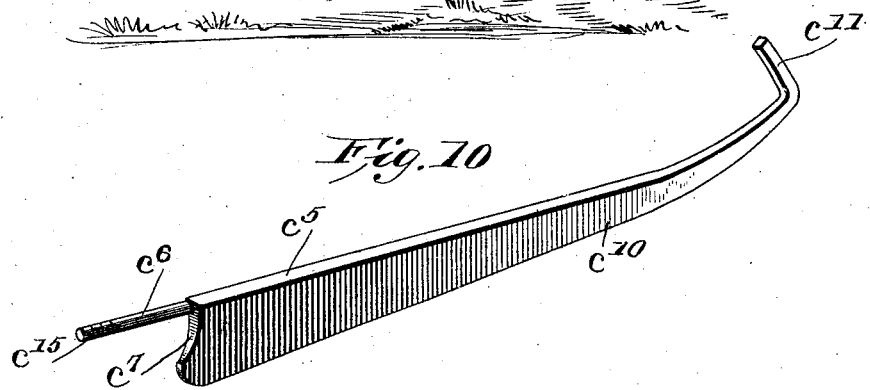
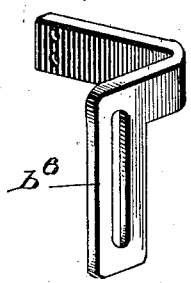
WITNESSES:
E. M. Callaghan
C. E. Tranor
INVENTOR
JOHN HETTRICH
BY Munn & Co.
ATTORNEYS

UNITED STATES PATENT OFFICE.

JOHN HETTRICH, OF GRAND ISLAND, NEBRASKA.

CORN-HARVESTER.

No. 846,204.

Specification of Letters Patent.

Patented March 5, 1907.

Application filed December 6, 1905. Serial No. 290,593.

*To all whom it may concern:*

Be it known that I, JOHN HETTRICH, a citizen of the United States, and a resident of Grand Island, in the county of Hall and State of Nebraska, have made certain new and useful Improvements in Corn-Harvesters, of which the following is a specification.

My invention is an improvement in cornharvesters, and consists in certain novel constructions and combinations of parts hereinafter described and claimed.

Figure 1:
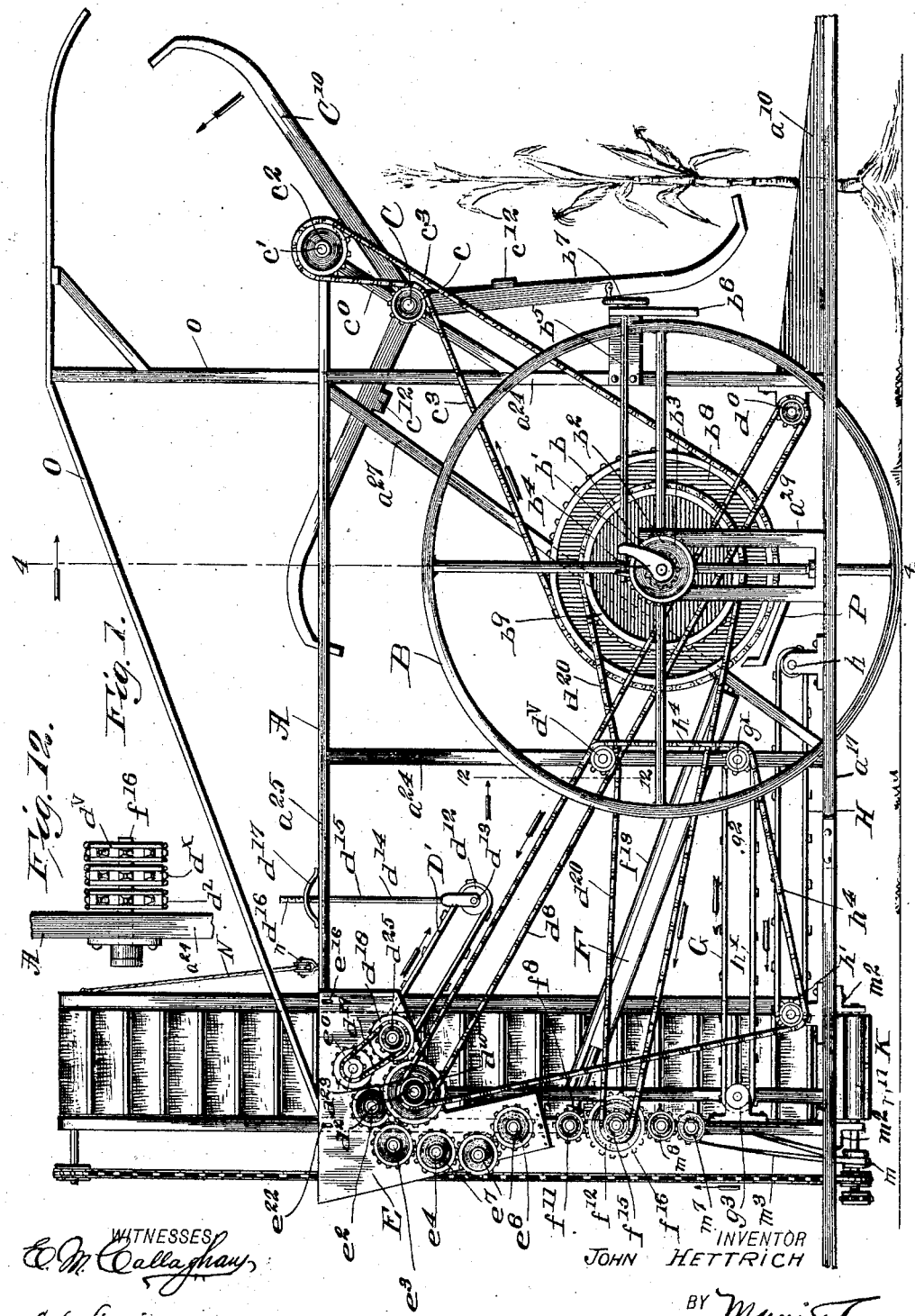
Figure 2:
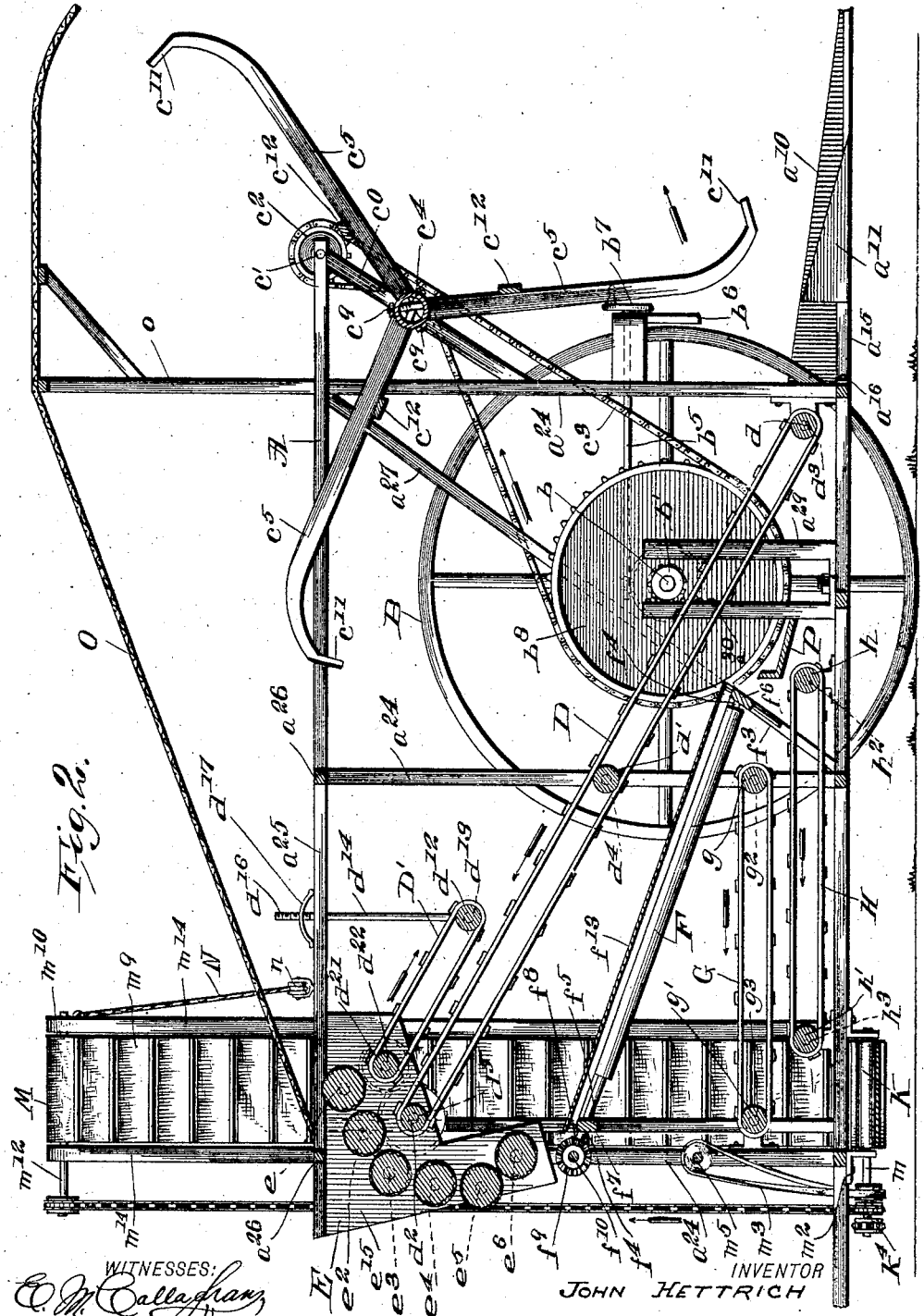
Figure 3:
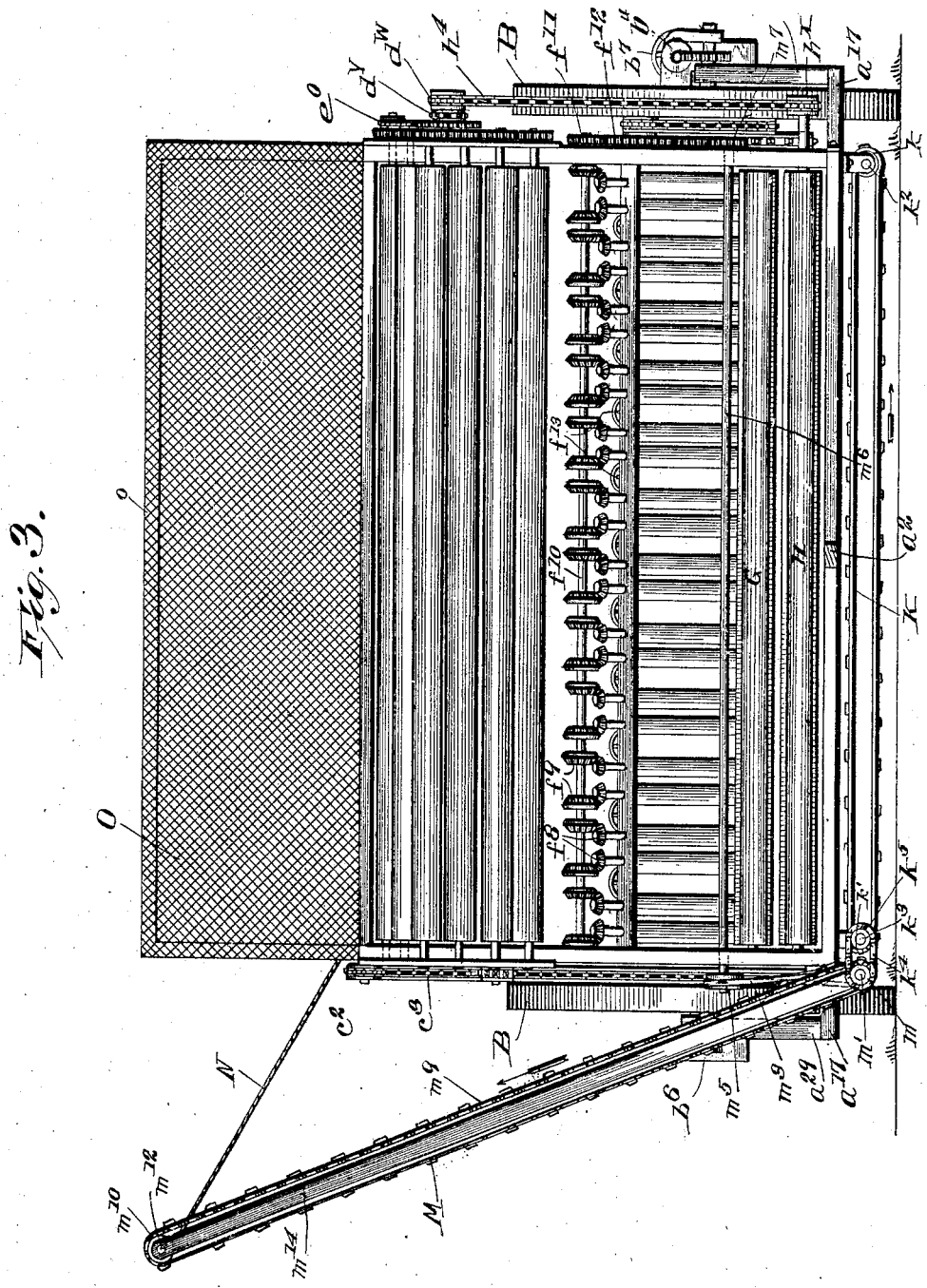
Figure 4:
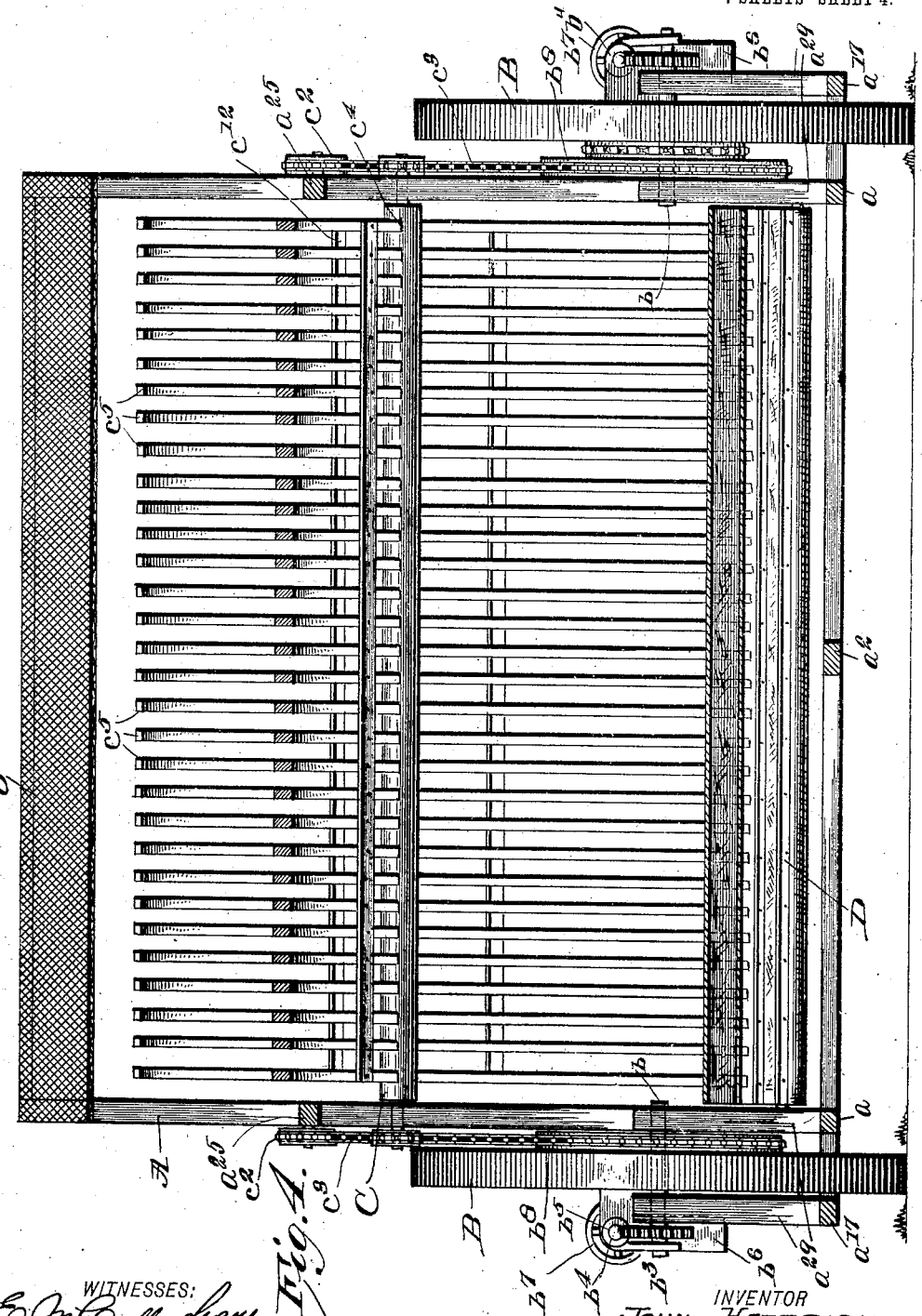
Figure 5:
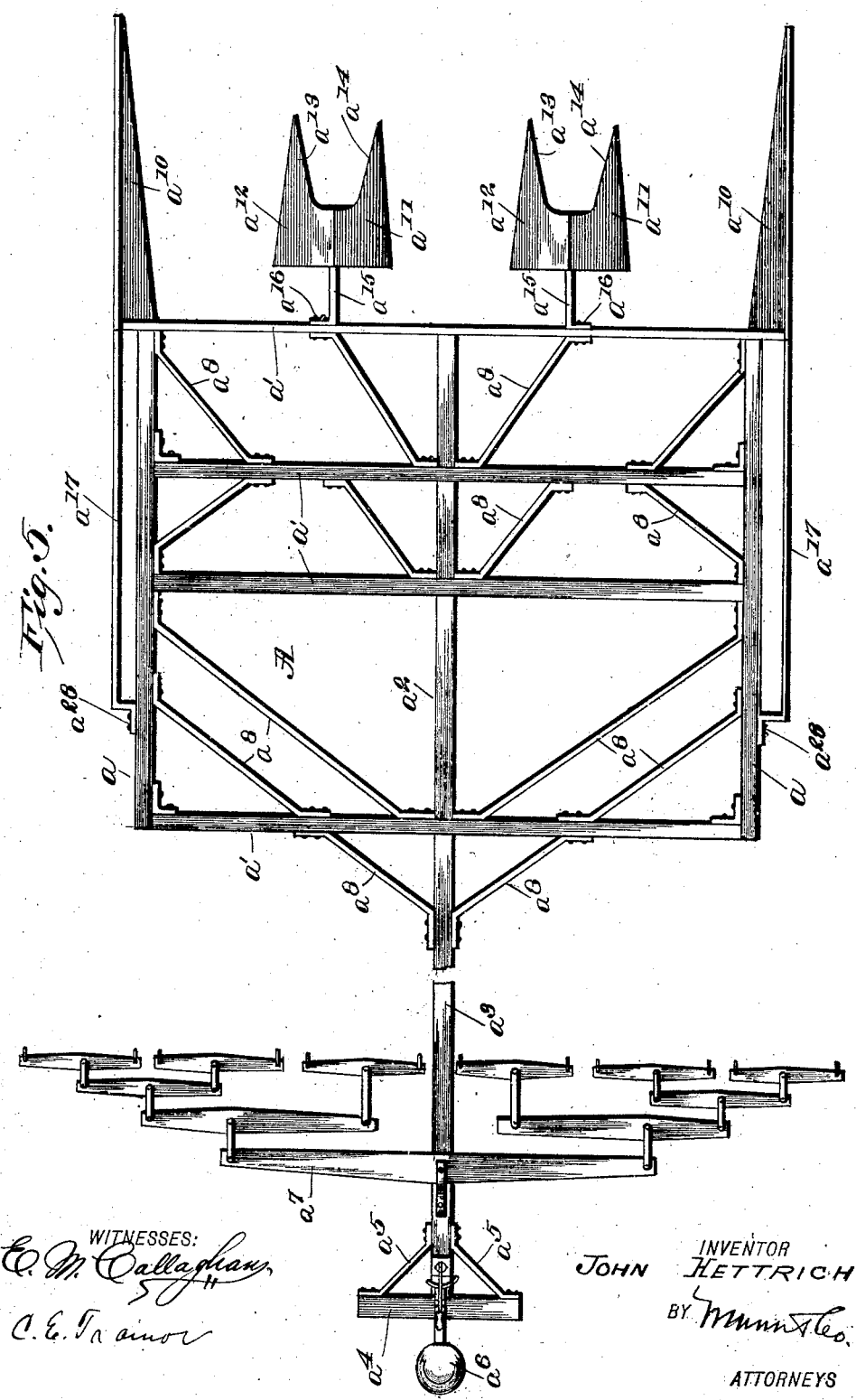
Figure 6:
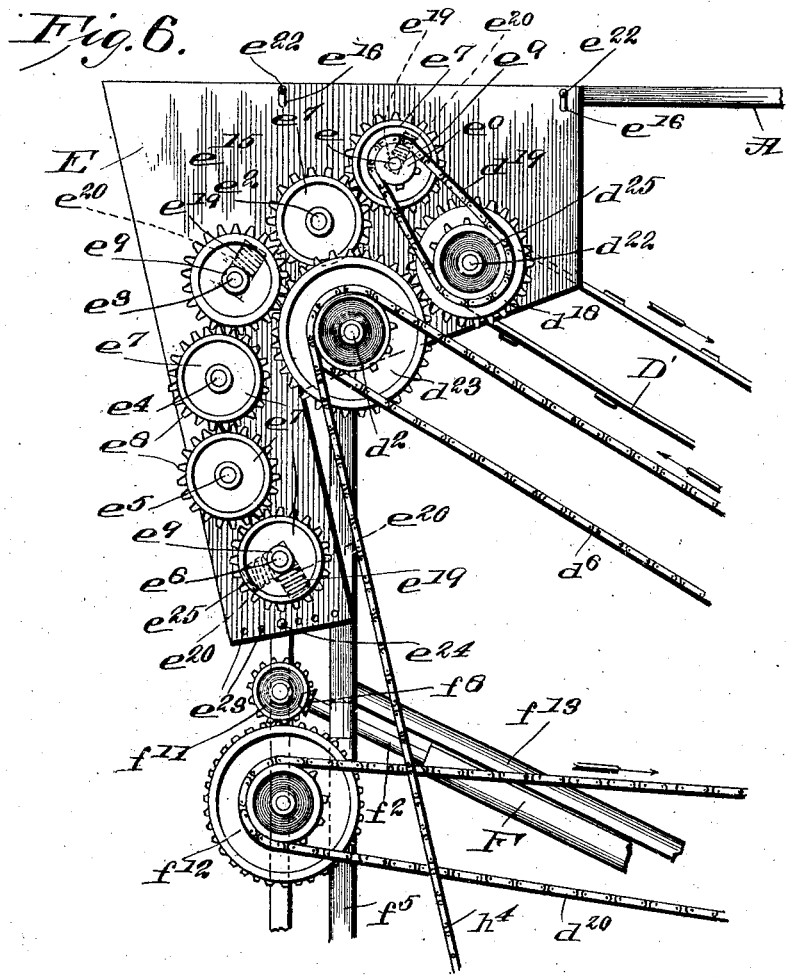
Figure 7:
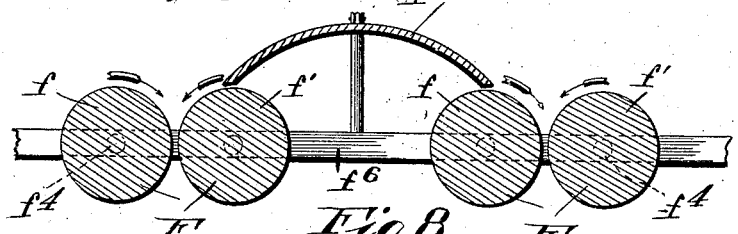
Figure 8:
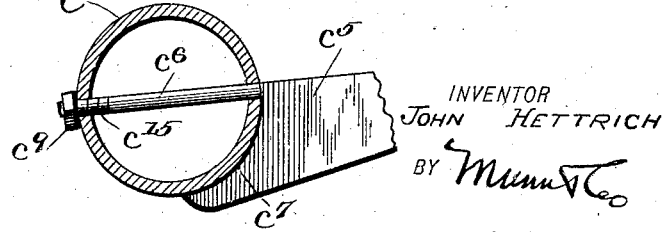

Referring to the drawings forming a part hereof, Figure 1 is a side view of my improved harvester. Fig. 2 is a central longitudinal section of the same. Fig. 3 is a rear elevation. Fig. 4 is a vertical transverse section on the line 4 4 of Fig. 1. Fig. 5 is a plan view of the base of the frame. Fig. 6 is a detail of the cornstalk-ejecting rollers.
Fig. 7 is a transverse section through a part of the husking-rollers, showing the arrangement of the shield. Fig. 8 is a detail sectional view of the connection of the teeth with the shaft. Fig. 9 is a detail perspective view of a part of the tongue, showing the guiding means. Fig. 10 is a perspective view of a tooth, and Fig. 11 is a similar view of the bracket supporting the rod for raising and lowering the frame, and Fig. 12 is a detail section on the line 12 12 of Fig. 1.

In the practical application of my invention, I provide a frame A, comprising a base composed of the side bars $a$, the cross-bars $a'$, and a central bar $a^2$, the central bar being extended rearwardly from the frame to form a tongue $a^3$. At the rear end of the tongue is a cross-piece $a^4$, connected by suitable braces $a^5$ with the tongue and upon the cross-piece is arranged a seat $a^6$, and doubletrees $a^7$ are secured to the tongue in advance of the cross-piece. The base is suitably braced by the braces $a^8$, extending between the side and the cross-bars and between the tongue and the rear cross-bar.

A grain-wheel $a^{19}$ of ordinary construction is pivoted in the bifurcated lower end of a shaft $a^{20}$, journaled in bearings $a^{21}$ on the tongue, and the upper end of the shaft is provided with a crank-arm or rudder $a^{22}$, hinged thereto and retained in its adjusted position by means of the toothed quadrant $a^{23}$, secured to a bracket on the tongue.

Uprights $a^{24}$, secured to the base, support the upper longitudinal bars $a^{25}$, the said bars being connected together by cross-bars $a^{26}$ and being suitably braced by the diagonal braces $a^{27}$.

Upon each side of the front of the machine are secured dividing-boards $a^{10}$, the ends of the front cross-bar being extended beyond the side bars to afford an attachment for the said dividing-boards, and attached to the extended ends of the side bars are brackets $a^{17}$, extending backwardly from the extended ends and being secured to the side bars by the bolts $a^{28}$. The brackets are spaced apart from the side bars to provide an opening for receiving the power-wheels B.

The front of the machine is approximately nine feet wide, and secured at points three feet from the corners thereof are intermediate dividing-boards $a^{11}$, having the form shown in Fig. 5 and comprising a base portion $a^{12}$, provided with the forwardly-projecting points $a^{13}$ $a^{14}$, the dividing-boards being provided with rearwardly-extending arms $a^{15}$, secured to the front cross-bar by the bolts $a^{16}$.

Upwardly-extending brackets $a^{29}$ are secured to the side bars $a$ and to the brackets $a^{17}$ upon each side of the machine, the brackets comprising spaced parallel members, one of which is provided with rack-teeth $a^{30}$.

Power-wheels B are arranged between the side bars and brackets, the wheels being secured to a shaft $b$, having loosely mounted upon the ends thereof pinions $b'$, meshing with the rack-teeth, the pinions being integral with spiders $b^2$, having upon the outer face thereof worm-wheels $b^3$, engaged by a worm $b^4$ upon a shaft $b^5$, journaled in a bracket $b^6$, secured to the uprights, the shaft being provided with a handle $b^7$ for convenience in manipulating the same. It will be understood that the above-described construction is the same on both sides of the machine.

A shaft C is journaled in bearings on braces $c^0$, projecting from the front of the machine, the shaft having secured to the outer end thereof a pinion $c$ of relatively small diameter. A sprocket-wheel $c^2$ of relatively large diameter is secured upon a stud-shaft $c'$, journaled on the braces slightly above and to the front of the shaft C. A sprocket-chain $c^3$ passes around a sprocket-wheel $b^8$ of relatively large diameter and rigid with the power-wheel and around the sprocket-wheel $c^2$, the upper run of the chain engaging the sprocket-wheel $c'$ to impart rotation to the shaft C in a direction the reverse to that of the power-wheel.

The shaft C is provided with longitudinal series of perforations $c^4$, the series being arranged at angular distances of one hundred and twenty degrees from each other and intended for the reception of pins $c^6$ integral with teeth $c^5$, the teeth being provided with shoulders $c^7$, engaging the periphery of the shaft, and the pins $c^6$ having screw-threaded ends $c^{15}$, engaged by nuts $c^9$ on the opposite side of the shaft. The teeth $c^5$ are of the form shown in Figs. 1, 2, and 10, comprising the portion $c^{10}$ and the hooked portion $c^{11}$, the outer face of the hooked portion conforming to the periphery of a circle whose center is the center of the shaft C. The teeth are in three series and are arranged along the entire longitudinal extent of the shaft C, as clearly shown in Fig. 4. They are rectangular in cross-section and are placed with the widest dimension in a vertical plane, being arranged upon the shaft a suitable distance apart to receive the stalks of corn between them and to strip the ears therefrom.

It will be evident from the peculiar arrangement of the hooked portion of the teeth that they will retain the stripped corn and carry it around the wheel to the upper side thereof, since the hooked portion when it engages the ears will be inclined upwardly and will prevent the corn from rolling off the same. A bar $c^{12}$ is arranged upon the front face of each of the series for the purpose of steadying the series, the bar being secured to the teeth in any suitable manner.

An endless carrier D is arranged within the frame for receiving the corn from the teeth, the carrier being supported upon the rollers $d\ d'\ d^2$, secured to the shafts $d^3\ d^4\ d^5$, journaled within the frame and provided upon the outer ends with sprocket-wheels $d^o\ d^x\ d^y$, over which passes a chain $d^6$ for constraining the rollers to move in unison. The endless carrier is driven by a chain $d^{20}$, passing over a sprocket-wheel $b^9$ of relatively small diameter, secured to the power-wheel, and over a second sprocket-wheel $f^{15}$, secured to a stud-shaft $f^{16}$, journaled at the rear of the frame. A sprocket-wheel $d^z$ on the shaft $d^4$ is engaged by the upper run of the chain, thus driving the upper run of the carrier rearwardly.

A second endless carrier D' is arranged with its lower run in parallelism with the upper run of the endless carrier D, the carrier D' being relatively short and arranged adjacent to the upper end of the carrier D. The carrier D' is supported at one end by a roller $d^{12}$, arranged upon a shaft $d^{13}$, the ends of the shaft being engaged by arms on the yoke $d^{14}$, whose body portion $d^{15}$ extends upwardly through a sliding bearing in the frame and is screw-threaded, as at $d^{16}$, and engaged by a nut $d^{17}$, resting upon the frame. The opposite end of the carrier is supported by a roller $d^{21}$, secured to a shaft $d^{22}$, journaled in the frame at the rear of the machine, the outer end of the shaft being provided with a gear-wheel $d^{18}$, meshing with a gear-wheel $d^{23}$ upon a shaft $d^2$. A sprocket-wheel $d^{25}$ is secured to the shaft $d^{22}$ outside of the gear-wheel and is engaged by a chain $d^{19}$, passing over a sprocket-wheel $e^o$ upon a shaft $e$, extending the full width of the machine and having secured thereto a corrugated roller $e'$.

The roller $e'$ forms one of a series of pairs of rollers forming a stalk-ejecting device E, the device comprising three pairs of corrugated rollers journaled in a pair of plates $e^{15}$, adjustably secured to the framework by means of slots $e^{16}$ in the upper edge of the plate, engaged by pins $e^{22}$ in the frame, and a series of perforations $e^{23}$ in the lower edge of the plate, likewise engaged by pins $e^{24}$ in the frame. The stalk-ejecting device comprises the shafts $e$, $e^2$, $e^3$, $e^4$, $e^5$, and $e^6$, provided with corrugated rollers and having upon the outer ends gear-wheels $e^7$, provided with deeply-cut teeth $e^8$, whereby the rollers may move apart from each other to some extent without getting out of mesh. The gear-wheel on the shaft $e$ meshes with the gear-wheel on the shaft $e^2$, the shaft $e$ being driven by the chain $d^{19}$, before mentioned. The gear-wheel $e^7$ of the shaft $e^3$ meshes with the gear-wheel $d^{23}$ on the shaft $d^2$ and with the gear-wheel $e^7$ on the shaft $e^4$, which in turn drives the shafts $e^5\ e^6$ through the intermeshing gear-wheels $e^7$ on said shafts.

The shafts $e$, $e^3$, and $e^6$ are provided with spring-pressed slidable bearings $e^9$, as clearly shown in Fig. 6. The plate $e^{25}$ is slotted at $e^{19}$ to receive the bearing $e^9$, and a spring $e^{20}$ is arranged between the bearing and end of the slot. The bearing $e^9$ for the shaft $e^6$ is movable in two directions, the plate being provided with an angular slot $e^{25}$, having a spring arranged in each arm and engaging the bearing.

Husking-rollers F are supported below the endless carrier D and parallel therewith, the rollers being arranged in sets of oppositely-rotating rollers $f\ f'$, and the rear ends of the rollers are reduced in size, as at $f^2$, to provide a space large enough to allow the passage of bits of cornstalk which may be broken off when the ears are snapped from the stalk. Each end of the roller is provided with shafts $f^4$, projecting therefrom and engaging perforations in upper and lower bars $f^7\ f^6$, mounted in bars $f^3\ f^5$ in the frame. A bevel-gear $f^8$ is secured to each roller above the upper bar, the bevel-gears of the rollers $f\ f'$ being oppositely-arranged with respect to each other and each meshing with a bevel-gear $f^9$ on a shaft $f^{10}$, journaled in bearings in the frame, the shaft being provided at its outer end with a pinion $f^{11}$, meshing with the pinion $f^{12}$ on the shaft $f^{16}$, journaled in the rear of the frame. Guards $f^{13}$, comprising arc-shaped plates, are arranged between the pairs of rollers, whereby to guide the corn into the grip of the same.

When the snapped corn is dropped upon the rollers, the husk is seized and stripped from the ear, the ear sliding down the rollers and onto an endless carrier H, arranged horizontally below the rollers and supported upon rollers $h\ h'$, secured to the shafts $h^2\ h^3$, journaled in the frame and driven by a sprocket-chain $h^4$, passing over sprocket-wheels $d^v, d^w, h^x$, and $g^x$, upon the shafts $d^4, d^5, h^3$, and $g^2$.

The husks are passed downward between the husking-rollers onto an endless carrier G, arranged above and to the rear of the endless carrier H. The carrier G is supported upon rollers $g\ g'$, secured to the shafts $g^2\ g^3$, journaled in the frame, and driven by the engagement of the sprocket-chain $h^4$, previously described, with a sprocket-wheel $g^x$ on the shaft $g^2$.

A transverse endless carrier K is arranged at the rear of the machine beneath the rear end of endless carrier H for receiving the corn therefrom, the endless carrier K being supported by rollers $k\ k'$, secured to the shafts $k^2\ k^3$, journaled in the frame and driven by means of a sprocket-chain $k^4$, engaging a sprocket-wheel $k^5$ upon the shaft $k^3$ and receiving power from a sprocket-wheel $m$ on the shaft $m'$, journaled in brackets $m^2$, projecting from the frame, the shaft $m'$ being in turn driven by a belt $m^3$, engaging a pulley $m^4$ thereon and a pulley $m^5$ upon a shaft $m^6$, extending transversely of the machine, and provided on its opposite end with a pinion $m^7$, driven by an idler $m^8$ from the pinion $f^{12}$.

The husked corn may be received directly from this endless carrier or may be elevated to the side of a wagon by means of an inclined elevator M, arranged adjacent to the end of the conveyer K and projecting upwardly at an angle therefrom. The elevator M comprises an endless carrier $m^9$, supported by a roller $m^{10}$, secured to the shaft $m^{12}$, journaled in a frame comprising the side bars $m^{14}$ connected in any suitable manner, and a roller $m^{11}$ on the shaft $m$, upon which the frame is rotatably mounted.

The endless carrier M may be elevated and depressed by means of the rope N, secured to the outer end thereof and passing through a pulley $n$ and secured to any suitable portion of the machine. A shield O, of wire netting or other suitable material, is arranged above the framework to prevent the ears of corn from being thrown too far to the rear. The shield O is supported by a bracket $o$, arising from the upper portion of the machine.

In operation my improved harvester is pushed through the field, being guided by the grain-wheel on the tongue and in such manner that three rows of corn are engaged by the front thereof, the dividing-boards serving to straighten up the leaning stalks. The teeth receive the stalks of corn between them, the distance between the teeth being sufficient to allow the stalk to pass, but not the ear of corn, the latter being snapped off and carried upward by the teeth which deliver onto the endless carrier D. The endless carrier elevates the ears of corn and drops them onto the reduced portions of the husking-rollers. The husk is torn from the corn by the husking-rollers and dropped upon the husk-conveyer G, by which it is delivered to the rear of the machine. The corn slides down the rollers until it reaches the endless carrier H, which delivers it to the transverse carrier K, from whence it is taken by the inclined elevator M and dropped into the wagon.

One of the principal features of my invention is the arrangement of the hooked portion of the teeth to conform with the arc of the circle having a radius equal to the length of the teeth. This arrangement tends to throw the snapped ear against the body of the teeth and prevents them from rolling off at the front thereof. At the lower end of the husking-rollers and spaced apart therefrom is a guard P to prevent the ears from falling over the end of the elevator.

It will be noticed from inspection of Figs. 1 and 6 that the rollers comprising the stalk-ejecting device are arranged in an arc around the delivery end of the conveyer D, the first pair of rollers being arranged approximately in line with the upper run of the conveyer, the second pair being arranged adjacent to the periphery of the rear roller of the conveyer, and the third pair being arranged below the second pair in such position that the ears falling from the end of the conveyer must travel over the said rollers in their passage to the husking-rollers. By this arrangement all of the bits of stalk remaining with the snapped ears are removed therefrom and ejected from the machine. The snapped ears in passing around the delivery end of the conveyer are constrained to travel in contact with a part of the rollers of the ejecting device and after dropping from the conveyer are constrained to travel over the remaining rollers in order to reach the husking device.

Having thus described my invention, what I claim as new, and desire to secure by Letters Patent, is—

1. In a corn-harvester and in combination, a frame, means for supporting the frame, means on the frame for snapping the ears from the stalks, a series of husking-rollers arranged behind the snapping means and inclined upwardly and backwardly, a conveyer arranged above the husking-rollers and substantially parallel therewith and delivering at its rear end to the said husking-rollers, a stalk-ejecting device comprising a series of transverse corrugated rollers arranged adjacent to the delivery end of the conveyer, whereby the delivered ears will be caused to travel over the rollers of the series, and a conveyer for receiving the husked ears arranged beneath the lower ends of the husking-rollers.

2. In a corn-harvester and in combination, a frame, means for supporting the frame, means on the frame for snapping the ears from the stalks, a series of husking-rollers arranged behind the snapping means, a conveyer arranged above the husking-rollers and delivering at its rear end thereto, a stalk-ejecting device comprising a series of transverse rollers arranged adjacent to the delivery end of the conveyer, whereby the delivered ears will be caused to travel over the rollers of the series, and a conveyer for receiving the husked ears from the husking-rollers.

3. In a corn-harvester and in combination, a frame, means for supporting the frame, means on the frame for snapping the ears from the stalks, a husking device supported by the frame, a conveyer delivering at its rear end to the husking device, and a stalk-ejecting device comprising a series of transverse rollers arranged adjacent to the delivery end of the conveyer, whereby the delivered ears will be caused to travel over the rollers of the series during their passage to the husking device.

JOHN HETTRICH.

Witnesses:
 WILLIAM HENRY THOMPSON,
 LIZZIE LIMBACK.